US011514378B2

(12) United States Patent
McSwiggan

(10) Patent No.: US 11,514,378 B2
(45) Date of Patent: *Nov. 29, 2022

(54) SYSTEM AND METHOD FOR QUEUE LOOK AHEAD TO OPTIMIZE AGENT ASSIGNMENT AND UTILIZATION

(71) Applicant: Verint Americas Inc., Alpharetta, GA (US)

(72) Inventor: Stephen McSwiggan, Glasgow (GB)

(73) Assignee: Verint Americas Inc., Alpharetta, GA (US)

(*) Notice: Subject to any disclaimer, the term of this patent is extended or adjusted under 35 U.S.C. 154(b) by 189 days.

This patent is subject to a terminal disclaimer.

(21) Appl. No.: 16/443,238

(22) Filed: Jun. 17, 2019

(65) Prior Publication Data

US 2020/0394591 A1 Dec. 17, 2020

(51) Int. Cl.
G06Q 10/06 (2012.01)
(52) U.S. Cl.
CPC . *G06Q 10/063112* (2013.01); *G06Q 10/0633* (2013.01); *G06Q 10/063114* (2013.01); *G06Q 10/063116* (2013.01)
(58) Field of Classification Search
CPC ... G06Q 10/063112; G06Q 10/063114; G06Q 10/0633; G06Q 10/063116
USPC ........................................................ 705/7.14
See application file for complete search history.

(56) References Cited

U.S. PATENT DOCUMENTS

| 10,062,042 B1* | 8/2018 | Kelly | G06Q 10/063112 |
| 2002/0159475 A1* | 10/2002 | Hung | H04M 3/5191 |
| | | | 370/465 |
| 2006/0229896 A1* | 10/2006 | Rosen | G06Q 10/1053 |
| | | | 705/321 |
| 2010/0165977 A1* | 7/2010 | McCord | H04M 3/5238 |
| | | | 370/352 |
| 2013/0061232 A1* | 3/2013 | Bernbo | G06F 3/0607 |
| | | | 718/103 |

(Continued)

FOREIGN PATENT DOCUMENTS

WO 2002103464 12/2002

OTHER PUBLICATIONS

A multi-agent learning approach to online distributed resource allocation; Zhang et al.; 2009 (Year: 2009).*

(Continued)

*Primary Examiner* — Timothy Padot
*Assistant Examiner* — Francis Z. Santiago Merced
(74) *Attorney, Agent, or Firm* — Christopher M. Scherer; DeWitt LLP

(57) ABSTRACT

An exemplary embodiment of the present application is a system and method for work allocation optimization. In the present disclosure, analytics are applied to work items while the work items are waiting in a work queue in order to optimize the routing and allocation of work items to agents in the most efficient manner possible, while optimizing the utilization of agents. By performing a look ahead at more than the initial work item, the system assesses the agent skills required by imminent work items in the work queue. This is then compared to a skillset of each available and/or soon to be available agent in order to achieve the optimal allocation of the work items to maximize utilization of agents. The work items are then routed to the agents accordingly.

17 Claims, 4 Drawing Sheets

(56) References Cited

U.S. PATENT DOCUMENTS

2014/0355749 A1* 12/2014 Conway .............. H04M 3/5238
379/265.1
2015/0106145 A1* 4/2015 Hamilton ....... G06Q 10/063114
705/7.15

OTHER PUBLICATIONS

International Search Report and Written Opinion for PCT/US2020/037911 dated Aug. 14, 2020.

* cited by examiner

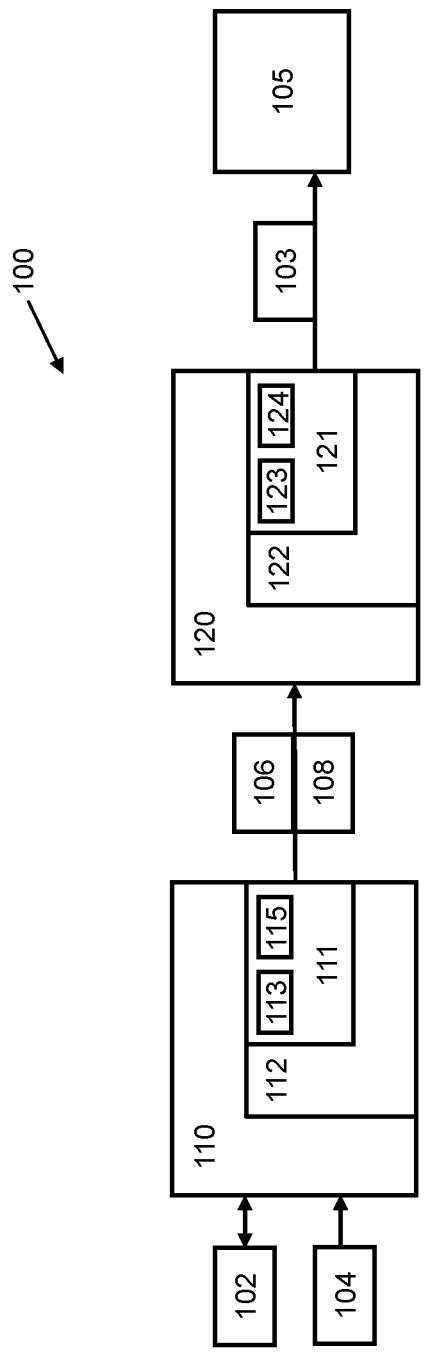

SYSTEM AND METHOD FOR QUEUE LOOK AHEAD TO OPTIMIZE AGENT ASSIGNMENT AND UTILIZATION

FIELD

The present disclosure is directed to a method for computer analysis. Specifically, the present disclosure is a system and method of optimizing work allocation assignment to agents while also optimizing the utilization of agents.

BACKGROUND

In a modern high-volume customer engagement center(s) (CEC) work allocation is usually subject to routing and queueing rules. This allocation method can often lead to a mix of different work being routed to one department, and queued in that department on a simplistic chronological manner based on arrival time and any relevant service level agreements (SLAs).

This simplistic method of work allocation within a department can lead to inefficiencies because a next available agent method of work allocation blindly allocates the next available agent. Oftentimes, the next available agent may not have an appropriate skillset to handle the next work item appropriately. In other instances, the next available agent may be overqualified to handle the work item assigned whereas the next agent may not be assigned a work item because they are underqualified for the following work items. The aforementioned inefficiencies typically result in the agent taking a larger amount of time to complete the work item, the work item requiring reallocation to another agent with the appropriate skillset, or a qualified agent being unavailable for an advanced work item because they have been assigned a work item requiring lesser skills.

Modern electronic scheduling programs are unable to provide such capabilities. As a result, customers may face inefficient handling of their call, excessive wait times to speak with a customer service representative (CSR), and excessive transfers of their calls, leading to increased customer dissatisfaction, and CSRs will be handling calls not suited for their skill set, thus wasting an organization's money.

There is an unmet need in the art for a system and method capable of looking ahead into the work queue in order to optimize assignment of work items to agents while also optimizing the utilization of agents.

SUMMARY

In the present disclosure, analytics are applied to work items while the work items are waiting in a work queue in order to optimize the routing and allocation of work items to agents in the most efficient manner possible, while optimizing the utilization of agents. By performing a look ahead at more than the initial work item, the system assesses the agent skills required by imminent work items in the work queue. This is then compared to a skillset of each available and/or soon to be available agent in order to achieve the optimal allocation of the work items. The work items are then routed to the agents accordingly.

Accordingly, the present application overcomes the historical problems with other scheduling technology by optimizing the assignment of work items to the best qualified agent while at the same time minimizing the number of agents that are unable to be assigned work items either because the system assigned overqualified agents to initial work items and the remaining agents are underqualified for the remaining work items or because the system held specialty agents for specialized work and no specialized work items existed.

An exemplary embodiment of the present application is a method for work allocation optimization. A work allocation engine (WAE) receives a work queue, which includes a set of work items, from the customer engagement center (CEC). The WAE also receives an agent list, which includes at least one agent, from the CEC. The WAE performs a work queue analysis of the work queue using a WAE software module on the WAE and generates an imminent work item list based on the work queue analysis. The WAE also performs an agent analysis of the work queue using the WAE software module on the WAE and generates an available agent list based on the agent analysis. The WAE passes the imminent work item list and the available agent list to a smart work allocator (SWA) and performs an optimization analysis of the first imminent work item based on the available agent list using a SWA software module on the SWA. The SWA assigns an available agent from the available agent list to the first imminent work item based on the optimization analysis of the SWA software module. The SWA updates the imminent work item list by removing the assigned first imminent work item and updates the available agent list by removing the assigned available agent.

Another exemplary embodiment of the present application is a system for work allocation optimization. The system includes a processor and a non-transitory computer readable medium programmed with computer readable code that upon execution by the processor causes the processor to execute the above-mentioned method for optimized work allocation.

Another exemplary embodiment of the present application is a non-transitory computer-readable medium programmed with computer-readable code that upon execution by a processor causes the processor to execute the above-mentioned method for work allocation optimization.

The objects and advantages will appear more fully from the following detailed description made in conjunction with the accompanying drawings.

BRIEF DESCRIPTION OF THE DRAWING(S)

FIG. 1 depicts a block diagram of an exemplary embodiment of a CEC system for work allocation optimization.

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 2A:
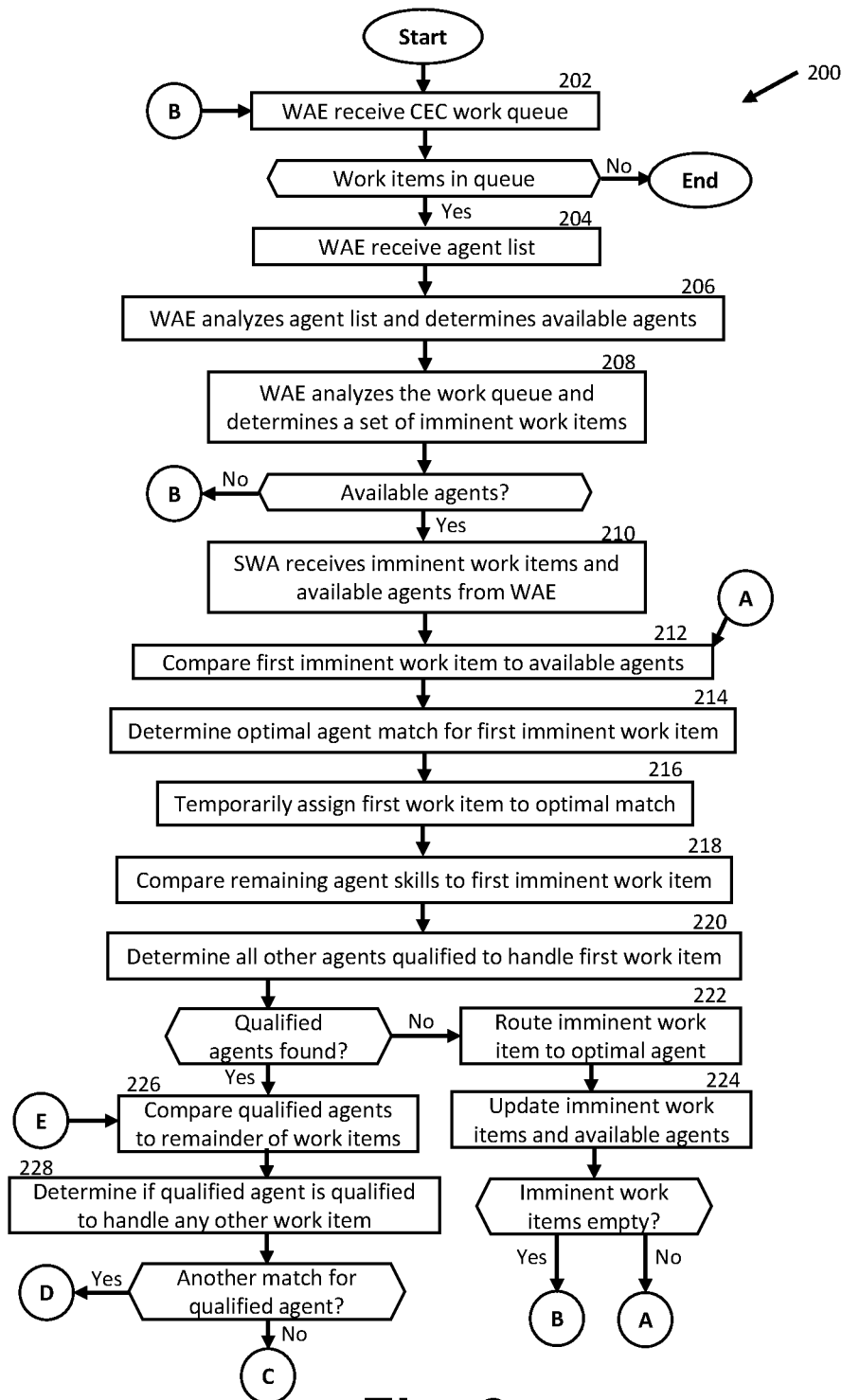
FIGS. 2a and 2b depict a flowchart of an exemplary embodiment of a method for work allocation optimization.
Figure 2B:
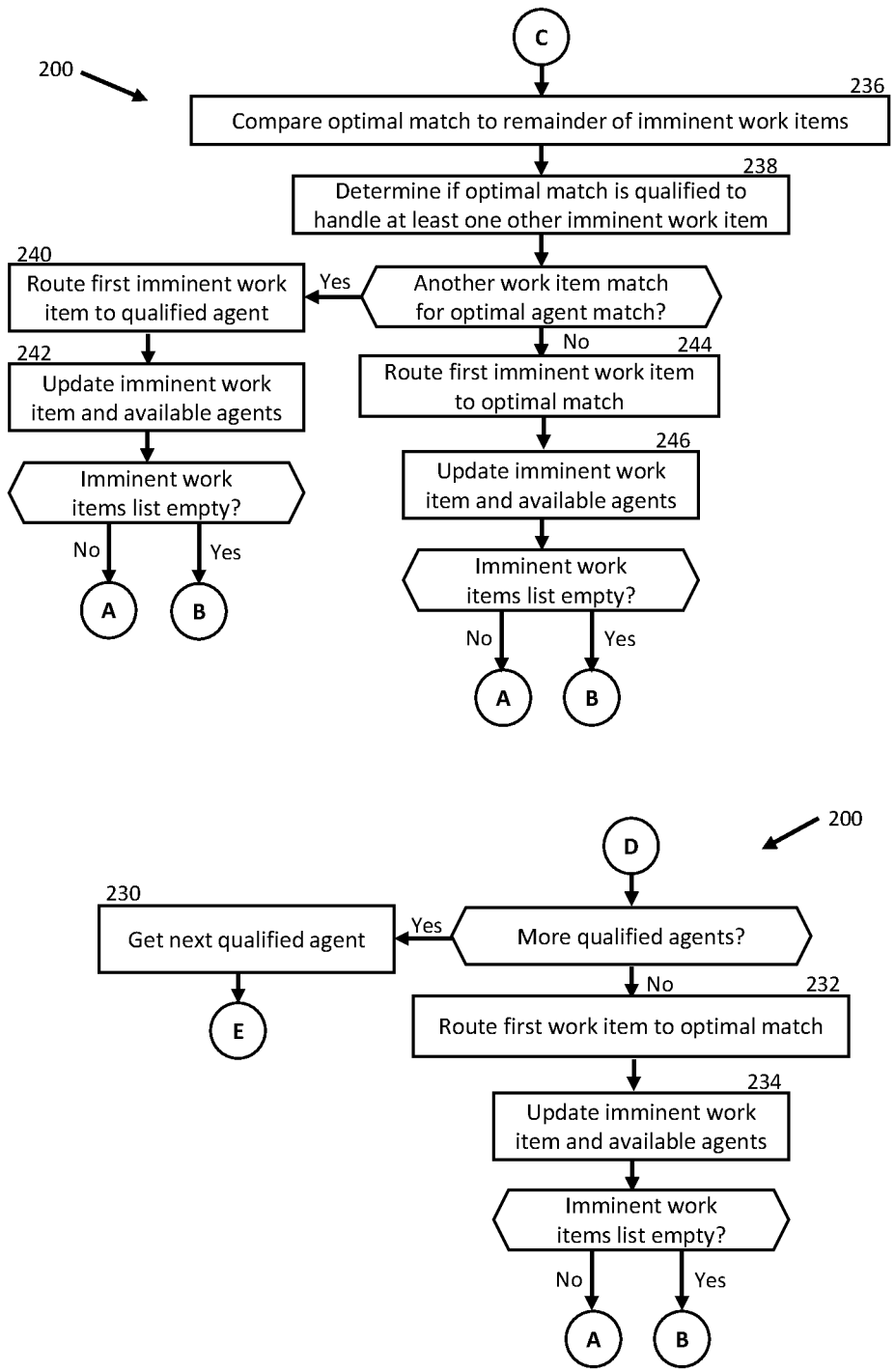

Referring to FIGS. 1, 2a, and 2b, CEC system 100 allows CSRs to engage with customers by ensuring agents are allocated to an appropriate work item 103, while maximizing the number of available agents 108 assigned to work items 103. A number of benefits are realized by implementing such a system 100 and method 200. First, the general efficiency of the CEC 100 is improved as routing work items 103 that have specific skill requirements from an imminent work queue 106 to available agents 108 having optimized skillsets reduces the instances of rerouting, reduces the work time for any particular work item 103, results generally in more efficient execution of the imminent work queue 106, and minimizes the number of available agents 108 who are not assigned work items 103. Second, by ensuring that available agents 108 with specialist skills are not prematurely matched with a work item 103 when another available agent 108 may be more appropriate for the work item 103 and it can be determined that the available agent 108 with specialized skills may be required for another work item 103 that is imminent but not immediate in the imminent work queue 106, the throughput of the CEC 100 can be maximized. In other words, specialist work items 103 will not be delayed because specialist available agents 108 have been utilized to complete standard work items 103 (i.e. work items 103 with common skill requirements), while at the same time available agents 108 with common skills will not be left waiting for work because their skill sets are not sufficient for the remaining work items in the imminent work queue 106.

By optimizing the decision to allocate work items 103 in the imminent work queue 106, the CEC system 100 and method 200 avoids starving available specialized agents 105 of work items 103 by blindly holding them in reserve in anticipation of specialist work items 103 which may not even have entered the imminent work queue 106. Further, by optimizing the decision to allocate work items 103 in the imminent work queue 106, the CEC system 100 and method 200 avoids starving available common agents 105 of work items 103 by blindly assigning work items to specialized agents to the first work items 103 in the imminent work queue 106 when the remainder of the work items 103 in the imminent work queue 106 may not be suitable for the available common agents 105.

FIG. 1 depicts an exemplary embodiment of CEC system 100 for work allocation optimization.

CEC system 100 includes a work acquisition engine (WAE) unit 110 having a WAE software module 111 and an optional WAS storage 112. WAE unit 110 may be a processor or a combination of a processing system and a storage system. WAE unit 110 receives the work queue 102 and list of agents 104 from the CEC system.

The work queue 102 contains a set of work items with associated required skills 103. Work items 103 are any task that needs to be routed to an agent in the CEC system for processing. For example, work items 103 may be a direct communication from a customer such as an email, text chat, phone call, letter, etc. Work items 103 may also be case work items such as a request for a skilled individual to perform a specific task as part of a multi-step case type. Work items 103 may be received from outside the CEC through any form that the CEC has available to receive incoming communications and requests, including audio communication such as a telephone call, a voice message, a video chat, or any other type of audio communication, written communication such as an email, an online posting, a direct message from a customer, or any other written communication. Work items 103 may also originate from inside the CEC. For instance, a manager may input a case work item into the CEC for processing or the CEC system may automatically generate work items based on certain conditions in the system being met. For example, in a CEC system where transactions occur, if a transaction occurs that is over a specified value, the system may automatically refer the transaction to the underwriting department or the fraud department and would automatedly generate a work item for the transaction. Each work item 103 has a set of required skills associated with the work item 103. The required skills correlate to skills associated with an agent's abilities. For example, work item i may require a Spanish-speaking agent, whereas work item i+1 may require an English-speaking agent with skills in returns. The required skills associated with a work item 103 may be an unordered listing of the necessary skills. In other embodiments, the required skills associate with the work item 103 may be an ordered list with the most essential/important skill listed first and the least essential/important skill listed last. In other embodiments, the required skills associated with the work item 103 may be labeled as mandatory or optional. In other embodiments, the required skills may be grouped by level of importance such as primary skills, secondary skills, tertiary skills, etc. It should be understood that the number of work items 103 in the work queue 102 may continually change and the system will dynamically adjust to include all waiting work items in the work queue 102 when received by the WAE 110.

The list of agents 104 contains the customer service representatives (CSR) for the CEC system. In some embodiments, the list of agents 104 may be a list of all agents for the CEC system. In other embodiments, the list of agents 104 may be the CSRs scheduled to work the current work shift. In yet other embodiments, the list of agents 104 may be dynamically generated based on the CSRs who have signed into the CEC system. The agents 105 contained on the list of agents may be at various stages of preforming work and may or may not be available to be assigned work. Each agent 105 in the list of agents 104 has a set of agent abilities associated with the agent. Every agent 105 will have at least one ability. The agent abilities are the types of skills in which the agent is qualified. For example, agent A may speak English and Spanish and may also be skilled in returns; whereas agent B may speak English and Spanish and be skilled in new accounts. As indicated above, the agent abilities will correlate to the required skills for work items 103. In embodiments, agent abilities may be an unordered list of skills. In other embodiments, agent abilities may be an ordered list where the agent's best skill is listed at the top and the agent's worst skill is listed at the bottom. In another embodiment, the agent abilities may be ordered by including a proficiency skill level associated with each ability for each agent 105. Still in further embodiments, the agent abilities may simply be designated as primary, secondary, tertiary, etc. for each agent 105. These are merely examples of how agent abilities may be ordered and should not be considered limiting. It should be understood that an agent's skill level/designation in an agent ability may change over time based on experience. Further in addition to agent abilities, each agent 105 has metadata that indicates whether the agent is actively assigned a work item 103, the type of work item 103 assigned, the average handling time (AHT) for that type of work item based on the agent's abilities, and the time the work item was started.

The WAE 110 analyzes the list of agents 104 based on the metadata associated with each agent 105, using the WAE software module 111 to determine available agents 108 and passes the list of available agents 108 to a smart work allocator (SWA) 120. The list of available agents 108 contains agents 105 who are not currently assigned a work item 103 and agents 105 who are assigned a work item 103, but are soon-to-be available (collectively available agents 108). The WAE can use a number of ways to determine if an agent is soon-to-be available. One embodiment of determining if an agent is soon-to-be available is based on the monitored AHT for each given type of work on any given channel. For example, the metadata includes if an agent 105 is working on a billing enquiry email and the AHT for that type of work item is 4 minutes. If the agent has been working on the work item for 3 minutes, the WAE can predict the agent will become free in 1 minute and based on a time threshold 113 within WAE software module 111 for soon-to-be available can add that agent to the list of available agents at the appropriate time. The time threshold 113 includes rules that may be conditioned on the number of agents 104, the number of work items 102, the number of agents not currently assigned work items, and the AHT for a work item. For example, the time threshold 113 could be based on a set time (1 minute, 2 minutes, 30 seconds, etc.), a percentage of time remaining based on the AHT for the work item, or a percentage of time remaining based on the amount of work items in the work item queue. In embodiments, a soon to be available agent could also be an agent whose schedule indicates they will be scheduled to be available within the time threshold 113. For example, if the time threshold is 3 minutes and the agent's schedule indicates the agent will be back from a break or a meeting or otherwise available within the time threshold 113, that agent would be considered an available agent. These are merely examples of how the time threshold 113 could be determined and should not be considered limiting.

The WAE 110 also analyzes the work queue 102 using the WAE software module 111 based on a set of imminent work item rules (IWIR) 115 to determine imminent work items 106 and passes the list of imminent work items 106 to the SWA 120. The list of imminent work items 106 includes the required skills associated with each work item 103 from the work queue 102.

The imminent work item rules 115 determine the order work items 103 are removed from the work queue 102 and the number of work items 103 that are included in the imminent work items 106. The imminent work item rules 115 may be conditioned on the number and type of work items 103 in the work queue 102 and/or the number and type of available agents 108. For example, IWIR 115 may indicate that imminent work items 106 are taken from the work queue 102 in a first-in first-out order. In embodiments, some work items 103 may be designated as urgent, and the IWIR 115 may indicate that urgent work items 103 should be included as imminent work items 106 ahead of other work items 103 in the work queue 102. In some embodiments, the IWIR 115 may indicated that the imminent work items 106 will be based on the SLA of the work item, such that the closer a work item is to breaching SLA the sooner it will be transferred to the imminent work item list 106. In embodiments, the number of imminent work items 106 is a set predetermined number. In this embodiment, it should be understood that if the number of current work items in the work queue is less than the predetermined number of imminent work items, the SWA 120 will receive all current work items from the work queue as the set of imminent work items. In other embodiments, the number of imminent work items the SWA 120 receives is dynamically determined by the IWIR 115. The analysis may be based on a percentage of total work items 103 in the work queue 102, the analysis may be based on the number of available agents 108, the analysis may be based on a combination of the number of work items 103 in the work queue 102 balanced against the number of agents available 108.

CEC system 100 also includes the SWA 120 having an SWA software module 121 and optional SWA storage 122. SWA 120 may be a processor or a combination of a processing system and a storage system. SWA 120 receives the set of imminent work items 106 with their required skills and the list of available agents 108 with their agent abilities and metadata from WAS unit 110 and analyzes the first imminent work item 103 and available agents 108 using SWA software module 121 to assign the first imminent work item 103 to an available agent 105 based on a determination of an optimal available agent using predetermined criteria 123 within SWA software module 121 and a determination of other matching agents using qualification rules 124 within SWA software module 121. Optionally, SWA 120 may also permanently or temporarily save a copy of the set of imminent work items 106, the list of available agents 108, and/or the determined first imminent work item assignment 124 to internal or external SWA storage 122.

Predetermined criteria 123 include rules conditioned on the list of available agents and each agent's abilities 108 and the first imminent work item and its required skills 103 to determine the optimal match agent for the first imminent work item 103. The determination of an optimal match agent 105 can be based off of any combination of matching available agent abilities 108 to the required skills for the first imminent work item 103, depending on the information available for each set of skills and the level of ordered detail for the agent abilities and the required skills for the work item 103. For example, in an embodiment, the predetermined criteria 123 may have a sliding goal for the optimal match agent. In this example the optimal match agent may be an available agent 108 who has an agent skill set that matches exactly the required skills for the imminent work item 103 (no more skills and no less skills than what is exactly required by the imminent work item 103). If there is no available agent with an exact skill set match, then the optimal match agent may be the first available agent 108 that has at least all of the required skills for the imminent work item 103 or the optimal match agent may be an available agent 108 that has at least all of the required skills for the imminent work item 103, but also has the least number of additional skills that are not required skills for the imminent work item 103. If there is no available agent who has all of the skills required for the imminent work item 103, then the next optimal match may be the available agent 108 who has the greatest number of skills of the required skills for the imminent work item 103. In this embodiment, the level of agent abilities and the level of skill required for the imminent work item 103 can also be taken into consideration, if that information is available, when determining the optimal match. In another embodiment, the predetermined criteria 123 for the optimal match agent may require that the available agent have at least the required skills of the imminent work item 103 and not consider an available agent 108 that does not have the required skills. In other embodiments, the predetermined criteria 123 for the optimal match may use the weight of the agents skills such that if two available agents 108 have the same skill set, but one agent has a necessary skill that is indicated to be a primary skill of that agent and the other agent does not have that skill indicated as a primarily skill the agent with the primary skill would be considered the optimal match. It should be understood that these are merely examples of predetermined criteria for determining the optimal match and should not be limiting.

Qualification rules 124 determine which available agents 108 are qualified to handle an imminent work item 106 based on what skills and/or level of skills are necessary for an agent to possess to be considered qualified to handle a work item. For example, one embodiment may have qualification rules 124 that require the agent to have at least the skills that the imminent work item 103 has as required skills to be considered qualified. In another embodiment the qualification rules 124 may require the agent can only be missing one skill than what are the required skills for the imminent work item 103. In another embodiment, an available agent 108 may be qualified provided they have the same language skill as the required skills of the imminent work item 103. In embodiments where the system has information pertaining to the level of skill needed for a work item and the level of skill possessed by agents, the qualification rules 124 may require that the available agent 108 not only possess at least the skills required by the required skills of the imminent work item 103, but also possess skills at least at the required level as required by the imminent work item 103. In another embodiment, the qualification rules 124 may require the available agent 108 to have at least one skill at the required level of the imminent work item 103. It should be understood that these are merely examples of predetermined rules for determining which agents are considered qualified to handle an imminent work item and should not be limiting.

The SWA software module 121 analyzes the optimal match agent and the qualified available agents to determine which of the selected and qualified available agents 108 should be assigned the first imminent work item 103. The SWA then assigns the first imminent work item 103 to the determined available agent 105.

In the exemplary embodiment, CEC system 100 also includes at least one CEC desktop (not pictured) used by the determined available agent 105 for receiving assignment of imminent work items 106. CEC desktop may also receive input for updating imminent work item rules 115, time threshold 113, predetermined criteria 123, and qualification rules 124.

FIGS. 2a and 2b depict a flowchart of an exemplary embodiment of method 200 for work allocation optimization.

At step 202, a WAE receives the work queue 102 from the CEC and determines if there are work items in the work queue. The CEC system provides a work queue 102 for work items 103 to be routed to agents 104.

If, at step 202, there are no work items 103 in the work queue, the method ends, otherwise the process moves on to step 204.

At step 204, the WAE receives a list of agents along with each agent's skill set 104.

At step 206, the WAE determines available agents 108 from the list of agents 104 and transfers the list of available agents 108 to a SWA. Available agents 108 are agents who are not currently assigned a work item 103 and agents that are soon-to-be available. Soon-to-be available agents are agents currently assigned a work item 103, but, as described above in FIG. 1, the WAE determines the agents are soon-to-be available based on the time threshold rules.

At step 208, the WAE analyzes the work queue 102, determines a set of imminent work 106 based on the analysis and passes the set of imminent work items 106 to the SWA.

It should be understood that steps 206 and 208 may be performed in reverse order, simultaneously, or near simultaneously.

If, at step 206, there are no available agents 108, then the method repeats from step 202, otherwise the process moves on to step 210.

At step 210, the SWA receives the list of available agents 108 and the set of imminent work items 106 from the WAE. The list of available agents 108 includes the agent abilities and metadata. The set of imminent work items 106 includes the required skills.

At step 212, the SWA will compare the required skills for the first imminent work item 103 to the agent skills for the available agents 108.

At step 214, based on the comparison in step 208, the SWA will determine an optimal match agent for the first imminent work item 103 based on predetermined criteria 123. The optimal match agent can be determined using a number of predetermined criteria for determining the optimal match agent. The determination of an optimal match agent can be based off of any combination of matching agent skills to the required skills for a work item, depending on the information available for each set of skills and the level of ordered detail for the agent skills and the required skills for the work item.

At step 216, the SWA temporarily assigns the first imminent work item 103 to the optimal match agent.

At step 218, the remaining available agents' skills 108 are compared to the first imminent work item 103.

At step 220, based on the comparison in step 218, the SWA determines if any other available agents 108, other than the optimal agent, are also qualified to handle the first imminent work item 103. The determination of which agents are qualified to handle an imminent work item can be determined in a number of ways using qualification rules 124 for determining what skills and/or level of skills are necessary for an agent to possess to be considered qualified to handle an imminent work item. Depending on the level of detail available for the required skills of the first imminent work item 103 and the level of detail available for the agent abilities for the available agents 108, the SWA may have different qualification rules 124.

When, at step 220, it is determined that no other available agents 108 are qualified to handle the first imminent work item 103, at step 222 the SWA routes the imminent work item to the optimal match agent.

At step 224, the imminent work items 106 and the available agents 108 are updated, removing the first imminent work item 103 from the imminent work items 106 and removing the assigned agent 105 from the available agents 108.

If there are still imminent work items that have been received by the SWA at step 224, the process will repeat from step 212 with the updated imminent work items 106 and the updated available agents 108.

If no imminent work items 106 remain at step 224, the system will repeat from step 202.

When, at step 220, it is determined that there are other available agents 108 qualified to handle the first imminent work item 103, at step 226, the skills of the qualified available agents determined in step 220 are compared to the required skills of the remaining imminent work items 106 by looking at each qualified agent in turn.

At step 228, the SWA determines if the qualified available agent has skills that enables the qualified available agent to handle any of the remaining imminent work items 106. This determination can be based on a number of criteria. It should be understood that the determination of whether an agent is qualified is likely to use the same qualification rules 124 as used in step 220 above. However, it is not necessary that these determinations use the same criteria.

When, in step 228, it is determined that the qualified available agent is also qualified to handle at least one other imminent work item 106 and there are more qualified agents determined at step 220 to be considered, at step 230 the SWA will move to the next qualified agent and repeat from step 226.

When, in step 228, it is determined that the qualified available agent is also qualified to handle at least one other imminent work item 106 and there are no more qualified available agents determined at step 220 to be considered, at step 232, the first imminent work item 103 is routed to the optimal match agent for that agent to handle as the assigned agent 105.

At step 234, the imminent work items 106 and the available agents 108 are updated, removing the first imminent work item 103 from the imminent work items 106 and removing the assigned agent 105 from the available agents 108.

If there are still imminent work items that have been received by the SWA at step 234, the process will repeat from step 212 with the updated imminent work items 106 and the updated available agents 108.

If no imminent work items remain at step 234, the process will repeat from step 202.

When, in step 228, it is determined that the qualified available agent is not able to handle at least one other imminent work item 106, at step 236, the SWA compares the optimal match agent to the remainder of imminent work items 106.

At step 238, based on the comparison in step 236, the SWA determines if there are any other imminent work items 106 that the optimal match agent is qualified to handle. This determination can be based on a number of criteria. It should be understood that the determination of whether an agent is qualified is likely to use the same qualification rules 124 as is used in step 220 above. However, it is not necessary that these determinations use the same criteria.

When, at step 238, it is determined that the optimal match agent is qualified to handle at least one other imminent work item 106, at step 240, the SWA routes the first imminent work item 103 to the qualified available agent as the assigned agent 105.

At step 242, the imminent work items 106 and the available agents 108 are updated, removing the first imminent work item 103 from the imminent work items 106 and removing the assigned agent 105 from the available agents 108.

If there are still imminent work items 106 that have been received by the SWA at step 242, the process will repeat from step 212 with the updated imminent work items and the updated available agents.

If no imminent work items remain at step 242, the system will repeat from step 202.

When, at step 236, it is determined that the optimal match agent is not qualified to handle any other imminent work items 106, at step 244, the SWA routes the first imminent work item 103 to the optimal match agent as the assigned agent 105.

At step 246, the imminent work items 106 and the available agents 108 are updated, removing the first imminent work item 103 from the imminent work items 106 and removing the assigned agent 105 from the available agents 108.

If there are still imminent work items 106 that have been received by the SWA at step 246, the process will repeat from step 212 with the updated imminent work items 106 and the updated available agents 108.

If no imminent work items remain at step 246, the system will repeat from step 202.

Figure 3:
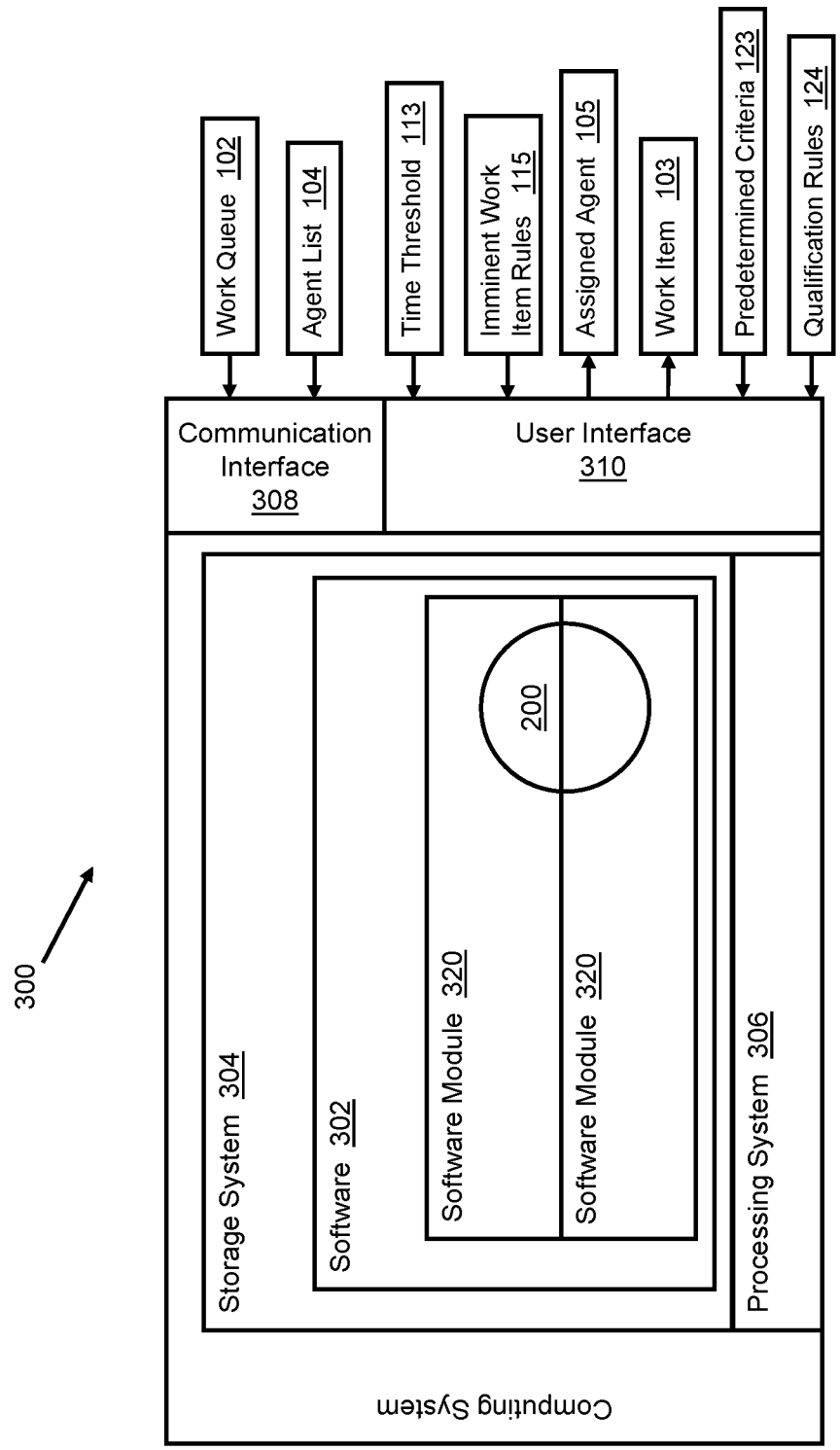
FIG. 3 depicts an exemplary embodiment of a system for work allocation optimization.

FIG. 3 depicts an exemplary embodiment of system 300 for work allocation optimization using CEC system 100.

System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes a software module 320 for performing the function of CEC system 100. Although computing system 300 as depicted in FIG. 3 includes two software modules 320 for performing the functions of Work Acquisition Engine (WAE) software module 110 and/or SWA software module 120 in the present example, it should be understood that one or more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other information. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

User interface 310 can include one or more CEC desktops, a mouse, a keyboard, a voice input device, a touch input device for receiving a gesture from a user, a motion input device for detecting non-touch gestures and other motions by a user, and other comparable input devices and associated processing elements capable of receiving user input from a user. The user interface 310 through the CEC desktops is also integrated into the CEC system 100 allowing the user to access the CEC telephone system, the CEC internet system, the CEC text communications systems, among other CEC systems. Output devices such as a video display or graphical display can display routed work items 103, the agent 105 to which the work item 103 is routed, or another interface further associated with embodiments of the system and method as disclosed herein. Speakers, printers, haptic devices and other types of output devices may also be included in the user interface 310. A CSR, a supervisor or other staff can communicate with computing system 300 through the user interface 310 in order to view routed work items 103, and in order to update time threshold rules 113, imminent work item rules 115, predetermined criteria 123, qualification rules 124, or any number of other tasks the CSR, supervisor or other staff may want to complete with computing system 300.

As described in further detail herein, computing system 300 receives and transmits data through communication interface 308. In embodiments, the communication interface 308 operates to send and/or receive data, such as, but not limited to, current work queue 102 and the listing of working agents with their respective skills 104 to/from other devices and/or systems to which computing system 300 is communicatively connected, and to receive and process input into the system. Such information can include input related to work item skill requirements and personnel skill sets.

It should be understood that the system and method is intended and capable of being operable in real-time or close to real-time to dynamically and automatedly assign incoming work items 103 in the work queue 102 to a dynamically changing list of available agents 108 to optimize the assignment of work items. However, it is also contemplated and possible for the system to receive a set work queue 102 and an initial list of available agents 108 to create a work assignment schedule by assigning work items 103 to available agents and then assigning the remainder of the work items from the work queue by simulating the work flow using the methods stated above for determining when an agent will become available to receive additional work items 103.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for real-time best match agent allocation, comprising:

providing a customer engagement center system for receiving work items and optimizing routing of incoming work items, the customer engagement center system including:
    a communication interface,
    a user interface,
    a work queue
    a source of a work item, the work item being a work item data structure comprising a work item identification, a type of work item, and a set of required skills associated with the work item,
    a work allocation engine,
    a smart work allocator, for binding and routing the work item, and
    a customer engagement center desktop,
    wherein the source of work item is operably connected to the communication interface, which is operably connected to the work queue, further wherein the work allocation engine is operably connected to the work queue and the smart work allocator, further wherein the smart work allocator is operably connected to the user interface which is operably connected to the customer engagement center desktop;

receiving the work item through the communication interface and adding the work item to the work queue in real time, the work queue comprising all work items received through the communication interface that are not yet included on an ordered imminent work items list;

receiving the work queue at the work allocation engine;

receiving an agent list from the customer engagement center system at the work allocation engine, the agent list including a plurality of agent identifications, each agent identification being an agent identification data structure comprising a set of agent abilities associated with the agent identification, and a set of agent metadata, the set of agent metadata including an indication of a currently assigned work item, a type for the currently assigned work item, an average handling time for the type of currently assigned work item, and a start time for the currently assigned work item;

generating, by the work allocation engine, an ordered imminent work item list by transferring all work items included in the work queue identified by the work allocation engine as imminent work items from the work queue to the smart work allocator, the ordered imminent work items list including a subset of work items data structures from the work queue classified by the work allocation engine as being imminent work items based on the type of work item, a quantity of work items in the work queue, and a current number of agent identification data structures on an available agent list;

generating, by the work allocation engine, the available agent list from the agent list by transferring all agent identifications included on the agent list that are available agent identifications and soon to be available agent identifications from the agent list to the smart work allocator, an available agent identification including all agent identification data structures with the indication of the currently assigned work item indicating no assigned work item, a soon to be available agent identification being all agent identification data structures that the work allocation engine predicts will have an indication of no assigned work item for the indication of the currently assigned work item within a threshold time;

generating, by smart work allocator, an optimal match agent identification for a first work item on the ordered imminent work item list, wherein the optimal match agent is determined based on the available agent list and the set of predetermined criteria, the optimal match agent identification being one agent identification data structure from the available agent list with the agent abilities most closely correlated to the set of required skills for the work item data structure associated with the first work item;

determining if any of the remaining agents in the available agent list are qualified to handle the first work item based on the available agent list and a set of qualification rules;

generating a qualified available agents list by adding the agent identification data structure for all qualified available agents from the available agents list to the qualified available agents list based on the set of qualification rules, a qualified agent being any agent identification data structure on the available agents list with agent attributes qualified to handle the first work item as determined by the set of qualification rules;

generating an indication of other match work items for each agent identification data structure associated with each qualified available agent on the qualified available agent list by, comparing the agent attributes of each agent identification data structure associated with each qualified available agent on the qualified available agent list to the required skills for the work item data structure of each remaining work item on the ordered imminent work item list and indicating if the qualified available agent is qualified to handle at least one of the remaining work items on the ordered imminent work item list based on the qualification rules;

binding the optimal match agent with the first work item when all of the qualified available agents on the qualified available agent list have an affirmative generated indication of other match work items, including assigning the optimal match agent an indication of assigned agent;

when at least one qualified available agent on the qualified available agent list has a negative generated indication of other match work items, performing an additional optimization process on the optimal match agent and all qualified agents on the qualified available agent list with a negative generated indication of other match work items, identifying an assigned agent for the first work item on the ordered imminent work items list based on the additional optimization process, and assigning the assigned agent the indication of assigned agent;

binding the agent identification data structure associated with the agent identification having the indication of assigned agent to the work item data structure for the first work item on the ordered imminent work item list;

updating the ordered imminent work item list by removing the work item data structure associated with the first work item from the ordered imminent work item list;

updating the available agent list by removing the agent identification data structure associated with the agent identification having the identification of assigned agent from the available agent list; and routing, by the smart work allocator, the first work item through the user interface to the customer engagement center desktop associated with the agent identification data structure associated with the agent identification having the indication of assigned agent.

2. The method of claim 1, further comprising repeating steps performed by the smart work allocator with the updated ordered imminent work item list and the updated available agent list until the ordered imminent work item list is empty.

3. The method of claim 1, wherein the available agent identifications are determined based on whether the agent identification is currently assigned a work item.

4. The method of claim 1, wherein generating soon to be available agent identifications include:
determining that an agent identification is soon to be available based on the indication of the currently assigned work item, the start time for the currently assigned work item, and a set of time threshold rules.

5. The method of claim 1, wherein the required skills are attributes that the customer engagement center system has determined are beneficial for handling the work item identification based on an analysis of the work item data structure by the customer engagement center system.

6. The method of claim 1, wherein the set of agent abilities are attributes indicating an ability of the agent associated with the agent identification to handle the required skills associated with the work item identification.

7. The method of claim 1, wherein the set of qualification rules utilize a comparison of the set of agent abilities associated with each of the remaining available agent identifications on the available agent list to the required skills of the first work item in determining if any of the remaining agents in the available agent list are qualified to handle the first work item.

8. The method of claim 1, wherein the additional optimization process includes:
determining a first qualified available agent from the qualified available agent list that is not qualified to handle any other work item on the ordered imminent work item list, wherein the first qualified available agent is the agent identification data structure that is first on the qualified available agent list that is not able to handle any other work items on the ordered imminent work item list;

comparing the agent abilities of the optimal match agent identification to each work item remaining on the ordered imminent work item list and determining if the optimal match agent identification is qualified to handle at least one other work item on the ordered imminent work item list;

rebinding the binding the agent identification data structure associated with the optimal match agent identification with the work item data structure associated with the first work item, when it is determined that the optimal match agent identification is not qualified to handle any of the remaining work items on the ordered imminent work item list, the rebinding including assigning the agent identification data structure associated with the optimal match agent identification the indication of assigned agent; and binding the agent identification data structure associated with the first qualified available agent to the work item data structure associated with the first work item, when it is determined that the optimal match agent is identification qualified to handle at least one other work item in the ordered imminent work item list.

9. A system for real-time best match agent allocation, comprising:
a Customer engagement center system for receiving work items and optimizing routing of incoming work items, the customer engagement center system including:

a communication interface,
a user interface,
a work queue
a source of a work item, the work item being a work item data structure comprising a work item identification, a type of work item, and a set of required skills associated with the work item,
a work allocation engine,
a smart work allocator, for binding and routing the work item, and
a customer engagement center desktop,
wherein the source of work item is operably connected to the communication interface, which is operably connected to the work queue, further wherein the work allocation engine is operably connected to the work queue and the smart work allocator, further wherein the smart work allocator is operably connected to the user interface which is operably connected to the customer engagement center desktop;
a processor, the processor operably couples to the communication interface, the user interface, the work queue, the work allocation engine, the smart work allocator, and the customer engagement center desktop; and
a non-transitory computer readable medium programmed with computer readable code that upon execution by the processor causes the processor to execute a method for real-time best match agent allocation, comprising:
receiving the work item through the communication interface and adding the work item to the work queue in real time, the work queue comprising all work items received through the communication interface that are not yet included on an ordered imminent work items list;
receiving the work queue at the work allocation engine;
receiving an agent list from the customer engagement center system at the work allocation engine, the agent list including a plurality of agent identifications, each agent identification being an agent identification data structure comprising a set of agent abilities associated with the agent identification, and a set of agent metadata, the set of agent metadata including an indication of a currently assigned work item, a type for the currently assigned work item, an average handling time for the type of currently assigned work item, and a start time for the currently assigned work item;
generating, by the work allocation engine, an ordered imminent work item list by transferring all work items included in the work queue identified by the work allocation engine as imminent work items from the work queue to the smart work allocator, the ordered imminent work items list including a subset of work items data structures from the work queue classified by the work allocation engine as being imminent work items based on the type of work item, a quantity of work items in the work queue, and a current number of agent identification data structures on an available agent list;
generating, by the work allocation engine, the available agent list from the agent list by transferring all agent identifications included on the agent list that are available agent identifications and soon to be available agent identifications from the agent list to the smart work allocator, an available agent identification including all agent identification data structures with the indication of the currently assigned work item indicating no assigned work item, a soon to be available agent identification being all agent identification data structures that the work allocation engine predicts will have an indication of no assigned work item for the indication of the currently assigned work item within a threshold time;
generating, by smart work allocator, an optimal match agent identification for a first work item on the ordered imminent work item list, wherein the optimal match agent is determined based on the available agent list and the set of predetermined criteria, the optimal match agent identification being one agent identification data structure from the available agent list with the agent abilities most closely correlated to the set of required skills for the work item data structure associated with the first work item;
determining if any of the remaining agents in the available agent list are qualified to handle the first work item based on the available agent list and a set of qualification rules;
generating a qualified available agents list by adding the agent identification data structure for all qualified available agents from the available agents list to the qualified available agents list based on the set of qualification rules, a qualified agent being any agent identification data structure on the available agents list with agent attributes qualified to handle the first work item as determined by the set of qualification rules;
generating an indication of other match work items for each agent identification data structure associated with each qualified available agent on the qualified available agent list by, comparing the agent attributes of each agent identification data structure associated with each qualified available agent on the qualified available agent list to the required skills for the work item data structure of each remaining work item on the ordered imminent work item list and indicating if the qualified available agent is qualified to handle at least one of the remaining work items on the ordered imminent work item list based on the qualification rules;
binding the optimal match agent with the first work item when all of the qualified available agents on the qualified available agent list have an affirmative generated indication of other match work items, including assigning the optimal match agent an indication of assigned agent;
when at least one qualified available agent on the qualified available agent list has a negative generated indication of other match work items, performing an additional optimization process on the optimal match agent and all qualified agents on the qualified available agent list with a negative generated indication of other match work items, identifying an assigned agent for the first work item on the ordered imminent work items list based on the additional optimization process, and assigning the assigned agent the indication of assigned agent;
binding the agent identification data structure associated with the agent identification having the indication of assigned agent to the work item data structure for the first work item on the ordered imminent work item list;

updating the ordered imminent work item list by removing the work item data structure associated with the first work item from the ordered imminent work item list;

updating the available agent list by removing the agent identification data structure associated with the agent identification having the identification of assigned agent from the available agent list; and routing, by the smart work allocator, the first work item through the user interface to the customer engagement center desktop associated with the agent identification data structure associated with the agent identification having the indication of assigned agent.

10. The system of claim 9, wherein the method performed by the non-transitory computer readable medium further includes repeating steps performed by the smart work allocator with the updated ordered imminent work item list and the updated available agent list until the ordered imminent work item list is empty.

11. The system of claim 9, wherein the available agent identifications are determined based on whether the agent identification is currently assigned a work item.

12. The system of claim 9, wherein generating soon to be available agent identifications include:

determining that an agent identification is soon to be available based on the indication of the currently assigned work item, the start time for the currently assigned work item, and a set of time threshold rules.

13. The system of claim 9, wherein the required skills are attributes that the customer engagement center system has determined are beneficial for handling the work item identification based on an analysis of the work item data structure by the customer engagement center system.

14. The system of claim 9, wherein the set of agent abilities are attributes indicating an ability of the agent associated with the agent identification to handle the required skills associated with the work item identification.

15. The system of claim 9, wherein the set of qualification rules utilize a comparison of the set of agent abilities associated with each of the remaining available agent identifications on the available agent list to the required skills of the first work item in determining if any of the remaining agents in the available agent list are qualified to handle the first work item.

16. The system of claim 9, wherein the additional optimization process includes:

determining a first qualified available agent from the qualified available agent list that is not qualified to handle any other work item on the ordered imminent work item list, wherein the first qualified available agent is the agent identification data structure that is first on the qualified available agent list that is not able to handle any other work items on the ordered imminent work item list;

comparing the agent abilities of the optimal match agent identification to each work item remaining on the ordered imminent work item list and determining if the optimal match agent identification is qualified to handle at least one other work item on the ordered imminent work item list;

rebinding the binding the agent identification data structure associated with the optimal match agent identification with the work item data structure associated with the first work item, when it is determined that the optimal match agent identification is not qualified to handle any of the remaining work items on the ordered imminent work item list, the rebinding including assigning the agent identification data structure associated with the optimal match agent identification the indication of assigned agent; and binding the agent identification data structure associated with the first qualified available agent to the work item data structure associated with the first work item, when it is determined that the optimal match agent identification is qualified to handle at least one other work item in the ordered imminent work item list.

17. A non-transitory computer readable medium programmed with computer readable code that upon execution by a processor causes the processor to execute a method for real-time optimized agent allocation to work items, comprising:

providing a customer engagement center system for receiving work items and optimizing routing of incoming work items, the customer engagement center system including:

a communication interface, a user interface, a work queue a source of a work item, the work item being a work item data structure comprising a work item identification, a type of work item, and a set of required skills associated with the work item, a work allocation engine, a smart work allocator, for binding and routing the work item, and a customer engagement center desktop, wherein the source of work item is operably connected to the communication interface, which is operably connected to the work queue, further wherein the work allocation engine is operably connected to the work queue and the smart work allocator, further wherein the smart work allocator is operably connected to the user interface which is operably connected to the customer engagement center desktop;

receiving the work item through the communication interface and adding the work item to the work queue in real time, the work queue comprising all work items received through the communication interface that are not yet included on an ordered imminent work items list;

receiving the work queue at the work allocation engine;

receiving an agent list from the customer engagement center system at the work allocation engine, the agent list including a plurality of agent identifications, each agent identification being an agent identification data structure comprising a set of agent abilities associated with the agent identification, and a set of agent metadata, the set of agent metadata including an indication of a currently assigned work item, a type for the currently assigned work item, an average handling time for the type of currently assigned work item, and a start time for the currently assigned work item;

generating, by the work allocation engine, an ordered imminent work item list by transferring all work items included in the work queue identified by the work allocation engine as imminent work items from the work queue to the smart work allocator, the ordered imminent work items list including a subset of work items data structures from the work queue classified by the work allocation engine as being imminent work items based on the type of work item, a quantity of work items in the work queue, and a current number of agent identification data structures on an available agent list;

generating, by the work allocation engine, the available agent list from the agent list by transferring all agent identifications included on the agent list that are available agent identifications and soon to be available agent identifications from the agent list to the smart work allocator, an available agent identification including all agent identification data structures with the indication of the currently assigned work item indicating no assigned work item, a soon to be available agent identification being all agent identification data structures that the work allocation engine predicts will have an indication of no assigned work item for the indication of the currently assigned work item within a threshold time;

generating, by smart work allocator, an optimal match agent identification for a first work item on the ordered imminent work item list, wherein the optimal match agent is determined based on the available agent list and the set of predetermined criteria, the optimal match agent identification being one agent identification data structure from the available agent list with the agent abilities most closely correlated to the set of required skills for the work item data structure associated with the first work item;

determining if any of the remaining agents in the available agent list are qualified to handle the first work item based on the available agent list and a set of qualification rules;

generating a qualified available agents list by adding the agent identification data structure for all qualified available agents from the available agents list to the qualified available agents list based on the set of qualification rules, a qualified agent being any agent identification data structure on the available agents list with agent attributes qualified to handle the first work item as determined by the set of qualification rules;

generating an indication of other match work items for each agent identification data structure associated with each qualified available agent on the qualified available agent list by, comparing the agent attributes of each agent identification data structure associated with each qualified available agent on the qualified available agent list to the required skills for the work item data structure of each remaining work item on the ordered imminent work item list and indicating if the qualified available agent is qualified to handle at least one of the remaining work items on the ordered imminent work item list based on the qualification rules;

binding the optimal match agent with the first work item when all of the qualified available agents on the qualified available agent list have an affirmative generated indication of other match work items, including assigning the optimal match agent an indication of assigned agent;

when at least one qualified available agent on the qualified available agent list has a negative generated indication of other match work items, performing an additional optimization process on the optimal match agent and all qualified agents on the qualified available agent list with a negative generated indication of other match work items, identifying an assigned agent for the first work item on the ordered imminent work items list based on the additional optimization process, and assigning the assigned agent the indication of assigned agent;

binding the agent identification data structure associated with the agent identification having the indication of assigned agent to the work item data structure for the first work item on the ordered imminent work item list;

updating the ordered imminent work item list by removing the work item data structure associated with the first work item from the ordered imminent work item list;

updating the available agent list by removing the agent identification data structure associated with the agent identification having the identification of assigned agent from the available agent list; and routing, by the smart work allocator, the first work item through the user interface to the customer engagement center desktop associated with the agent identification data structure associated with the agent identification having the indication of assigned agent.

* * * * *